United States Patent [19]
Stone et al.

[11] Patent Number: 5,982,481
[45] Date of Patent: Nov. 9, 1999

[54] ALIGNMENT SYSTEM AND METHOD FOR DISH CONCENTRATORS

[75] Inventors: Kenneth W. Stone, Huntington Beach, Calif.; James B. Blackmon, Brownsboro, Ala.

[73] Assignee: McDonnell Douglas Corporation, Long Beach, Calif.

[21] Appl. No.: 08/941,798

[22] Filed: Sep. 30, 1997

Related U.S. Application Data

[60] Provisional application No. 60/027,309, Oct. 1, 1996.

[51] Int. Cl.$^6$ .............................. G01B 11/26; G01B 11/24
[52] U.S. Cl. .................................. 356/152.2; 356/139.03; 356/376
[58] Field of Search ................................ 356/376, 141.1, 356/152.3, 141.5, 139.03, 152.2

[56] References Cited

U.S. PATENT DOCUMENTS

| | | |
|---|---|---|
| 3,602,594 | 8/1971 | Cook et al. . |
| 4,436,417 | 3/1984 | Hutchin . |
| 4,721,386 | 1/1988 | Collyer . |
| 4,834,531 | 5/1989 | Ward . |
| 5,002,396 | 3/1991 | Ozawa . |
| 5,042,945 | 8/1991 | Shibata . |
| 5,455,670 | 10/1995 | Payne et al. .............................. 356/5.1 |
| 5,477,332 | 12/1995 | Stone et al. . |
| 5,493,392 | 2/1996 | Blackmon et al. . |
| 5,513,000 | 4/1996 | Smith et al. .......................... 356/152.2 |

OTHER PUBLICATIONS

"Development and Performance of a Digital Image Radiometer for Heliostat Evaluation at Solar One" J.B. Blackmon; pp. 1–8.

*Primary Examiner*—Stephen C. Buczinski
*Attorney, Agent, or Firm*—Stout, Uxa, Buyan & Mullins, LLP; Donald E. Stout

[57] ABSTRACT

An apparatus and method for precisely aligning individual facets on a dish concentrator located at most any location. The basic components of the present alignment system includes a camera and light assembly, an alignment device, an operator controller, and a support member for supporting the camera and light assembly. The camera and light assembly illuminate each facet individually and identifies the reflections using the camera in conjunction with a processor to compile a register of light reflection data. The operator controller processes this light data and calculates the normal vector for each facet. Once the facet normal vector is determined, the difference between the actual angular position of the facet and the optimum alignment position is determined. The facet may then be adjusted or aligned to a desired aimpoint on the concentrator. After each facet is aligned, the process may be repeated for increased accuracy. The quantitative data obtained and used to align each facet may also be used to analyze the dish collectors performance which may also be archived to assist in determining and identifying future problems. Portability of the apparatus is enhanced by the present apparatus's light weight and small size.

24 Claims, 10 Drawing Sheets

HORIZONTAL PIXEL NUMBER

| | 1 | 2 | 3 | | 254 | 255 |
|---|---|---|---|---|---|---|
| 1 | 201 | 230 | 156 | ○ ○ ○ | 189 | 235 |
| 2 | 190 | 231 | 189 | ○ ○ ○ | 222 | 223 |
| 3 | 189 | 221 | 190 | ○ ○ ○ | 245 | 234 |
| ⋮ | ⋮ | ⋮ | ⋮ | ⋮ | ⋮ | ⋮ |
| 253 | 234 | 213 | 236 | ○ ○ ○ | 204 | 240 |
| 254 | 236 | 215 | 225 | ○ ○ ○ | 196 | 238 |
| 255 | 240 | 241 | 221 | ○ ○ ○ | 195 | 179 |

VERTICAL PIXEL NUMBER

COMPOSITE LIGHT INTENSITY FILE

Fig. 7a

HORIZONTAL PIXEL NUMBER

| | 1 | 2 | 3 | ○ ○ ○ | 254 | 255 |
|---|---|---|---|---|---|---|
| 1 | 8 | 8 | 8 | ○ ○ ○ | 20 | 12 |
| 2 | 8 | 8 | 3 | ○ ○ ○ | 20 | 12 |
| 3 | 3 | 3 | 3 | ○ ○ ○ | 12 | 12 |
| ⋮ | ⋮ | ⋮ | ⋮ | ⋮ | ⋮ | ⋮ |
| 253 | 5 | 5 | 1 | ○ ○ ○ | 40 | 0 |
| 254 | 3 | 1 | 1 | ○ ○ ○ | 32 | 32 |
| 255 | 3 | 1 | 3 | ○ ○ ○ | 32 | 32 |

VERTICAL PIXEL NUMBER

COMPOSITE LIGHT NUMBER FILE

Fig. 7b

ALIGNMENT SYSTEM AND METHOD FOR DISH CONCENTRATORS

CROSS REFERENCE TO RELATED APPLICATIONS

This application claims the benefit of U.S. Provisional Application Ser. No. 60/027,309, entitled, *Alignment System and Method for Dish Concentrators*, filed Oct. 1, 1996.

FIELD OF THE INVENTION

This invention relates generally to systems and methods for determining the optical characteristics of a reflective surface and more particularly, to systems and methods for aligning reflective surfaces for use in dish concentrators.

BACKGROUND OF THE INVENTION

In recent years, solar power has become increasingly examined and used as a viable alternative to current energy production systems. There are many different methods and apparatuses for producing power from solar energy, but a more common and viable method includes systems which use reflective surfaces to concentrate or focus sunlight onto a receiving location where it is converted to electrical or thermal energy. However, to maximize the transfer and concentration of solar energy and increase energy production efficiency, the reflective surfaces must be precisely aligned to the receiving location.

Of these solar concentrating devices utilizing reflective surfaces, one of the more useable approaches includes dish concentrators having paraboloidal reflecting surfaces which reflect the solar or other energy to a receiver or receiving location. Typically, the paraboloidal surfaces are made up of individual reflective surfaces of facets which direct the impinging energy such that the maximum concentration of solar flux is focused at the collector or receiver. To maximize the efficiency of the concentrator, as well as increase usability in differing environments, each facet surface is individually adjustable.

Each reflective surface or facet must be individually adjusted such that it is precisely aligned to reflect the optimum concentration of solar power or flux to the receiver. In general, the receiver is located at the focal point of the concentrator. In addition, each facet is preferably aligned such that the flux reflected from each facet strikes the receiver at a slightly different locations or points. Thus, each facet will generally have a slightly different aimpoint.

In particular, the flux distribution on the receiver must be distributed so as to prevent hot spots of excessive flux concentration. This distribution increases the efficiency of the concentrator and extends the life of the receiver. Thus, there is a need for an apparatus and method for precisely aligning individual facets on a dish concentrator. This need for precise alignment also applies to dish concentrators and antennas used in radar, electromagnetic and other energy applications.

In order to align each facet so that the amount of flux at the aim point, or within a given distance of the aim point, is maximized to a high statistical confidence level, a large amount of data relating to the reflecting facets must be obtained. The data is generally taken from spaced apart locations on each facet and then used to calculate the best estimate of the facet normal. Once the facet normal is determined, the facet can be precisely aligned relative to that normal. Thus, there is a need for an apparatus and method that can obtain and utilize a large amount of data from each facet.

Quantitatively measuring actual alignment accuracy for each facet provides information that can be used to determine the performance of the concentrator. This alignment accuracy data can also be archived and used to identify future performance problems such as whether the alignment of any facet has changed. Thus, there is a need for an apparatus and method that can determine facet alignment accuracy and system performance as well as archive such data.

A method and system for determining the surface characteristics of objects is described in U.S. Pat. No. 5,477,332. More specifically, this patent discloses a method and apparatus using digital imaging radiometer technology to determine the optical characteristics of a reflective or refractive surface such as a concentrator facet. However, the system cannot determine the inertia position of each facet normal on a dish concentrator and cannot provide alignment information.

A prior art method for aligning facets on a dish concentrator uses a beam of light and a target or screen mounted on the concentrator. The light is reflected from each of the facets and onto the target or screen. An optical computer is used to calculate the projections of the facet corners onto the screen. The angular position of the facets is then adjusted until the light image is within defined boundaries. Although this system provides the ability to align individual facets, precise alignment accuracy is not possible.

For example, the system relies on human judgement as to when the light image on the screen is in the best location with respect to the calculated image. Since judgements differ, each person generally adjusts each facet slightly differently. Additionally, the process requires close attention and is tiring, leading to a loss of alignment accuracy as well as mistakes as the person doing the aligning becomes fatigued. Thus, there is a need for a system that does not rely on human judgement.

An additional problem with this prior art system occurs when aligning the facets at different aim points on the receiver or correcting for the effects of gravity bending on the concentrator. In these situations, the theoretical projected light images of some of the different facets will overlap. In order to align a facet, neighboring facets with overlapping light images must be covered up. This covering and uncovering of facets greatly increase the time, labor and costs to perform the alignment process.

In order to distinctly see the reflective light images the process must be done in the dark. For an installed dish concentrator, this means the alignment process would have to be conducted at night. Moonlight is an additional problem. Thus, there is a need for an apparatus and method for precisely aligning individual facets on dish concentrators that is relatively simple and does not require darkness.

An additional problem encountered with dish concentrators occurs during field set-up or when a facet on an active concentrator is damaged or otherwise needs to be repaired and realigned. The problem is worsened when the concentrator is in a remote or otherwise inaccessible location. To accommodate these repairs, the alignment system must be portable such that it can be easily transported to the location of the concentrator. The system must also be easily set-up and quickly operational in order to reduce the downtime of the damaged concentrator. Thus, there is a need for a facet alignment system that can be used with a commercial concentrator system that is cost effective, fast and requires little attention from high-skilled personnel. Additionally, there is a need for a light-weight and very portable alignment system that can be easily transported into remote areas, including space applications.

SUMMARY

The present invention solves the need for a method and apparatus that precisely aligns individual facets on a dish collector or concentrator by providing a portable digital image radiometer facet alignment apparatus and method. As used herein, the terms dish collector, dish concentrator as well as parabolic dish concentrator or merely, concentrator, shall be synonymous and shall be interpreted to include any device for reflecting and concentrating light or wave energy. The apparatus and associated method of the present invention extends upon and improves the technology covered in U.S. Pat. No. 5,477,332, entitled, Digital Image System and Method for Determining Surface Reflective and Refractive Characteristics of Objects, issued Dec. 19, 1995, which is herein expressly incorporated by reference. Whereas the disclosure of U.S. Pat. No. 5,477,322, may be used to determine the optical characteristics of a reflective surface, the present invention uses digital image radiometer technology and applies it to dish concentrators to determine the inertia position of each facet normal. Once the inertia position of each facet normal is known, the facet can be adjusted until the individually reflected beams are each aligned with the optimum aligned position on the associated receiver and thus, the power output or other concentration of wave energy is maximized.

Broadly, the present invention precisely aligns each facet to a specific aimpoint on the receiver using special, multiple radiation sources, or light sources, that are configured and calculated for the specific dish concentrator design. This configuration ensures that is reflective data across the reflective surface of each facet is obtained. Therefore, the facet will be aligned such that the incident solar or other reflected beam's centroid based on the entire reflective surface of the facet will be at the desired aimpoint. The result is a desired flux distribution on the receiver and a maximum power output.

The facet alignment system of the present invention uses a special video camera to measure the location and intensity of the reflected light image as light data. This light data is used to calculate the facet normal for each facet. The angular difference between the calculated actual normal and the required or optimum normal is used to adjust the facet until the difference is zero and the facet is precisely aligned.

More specifically, the alignment system of the present invention advantageously provides a sufficient number of measured data points across the reflective surface of each facet to accurately determine the alignment error and thus, the necessary corrections to accurately align each facet. The large number of data points are acquired by using an appropriate number of specifically spaced and sized lights or other radiation sources which are properly positioned relative to the concentrator to illuminate across entire reflective surface of each facet so as to obtain the necessary cant angle for the facet and to do so within a certain tolerance level and a given confidence. These data points may also be used to analyze the efficiency and performance of the concentrator and may also be archived to assist in determining and identifying future concentrator problems.

The present invention is directed to an apparatus for aligning a facet on a parabolic dish concentrator having a plurality of individually adjustable facets. The facets each have a reflective surface for reflecting an incident energy towards a plurality of aimpoints on a receiver associated with the concentrator. The receiver is typically coupled to the concentrator forwardly of the facets.

The apparatus includes a light assembly having a plurality of essentially identical light sources. The light assembly comprises a light panel that is spaced apart from the plurality of facets. In addition, each of the light sources is separated and spaced apart on the light panel. The light sources are adapted to be individually illuminable for illuminating a selected location on the reflective surface of the facet.

A camera having a lens with an adjustable iris is supported adjacent the light assembly. The camera is generally positioned a fixed distance from the plurality of facets similarly to the light assembly. The camera is adapted and oriented to receive and detect at least a portion of the light reflected from each of the locations on the reflective surface of the facet.

An alignment device is mounted on the concentrator and adapted for aligning the camera and particularly, the lens with a fixed position on the concentrator. The alignment device also ensures that the lens does not deviate from the fixed position relative to the plurality of facets. The alignment device includes a fixture having a central bore and a laser. The alignment device is supported relative to the concentrator such that the central bore defines an axis parallel to a centerline of the concentrator. The laser is fixedly supported in relation to the concentrator and adapted for emitting a laser beam through the central bore and into the lens of the camera. The camera is adjustably mounted such that it may be aligned to receive the emitted laser beam and maintained in alignment.

A support member supports the camera and the light assembly separately and spaced apart from the concentrator. Positioning cables having opposing ends may be attached at one end to the concentrator and at the other end to the camera and light assembly. The positioning cables are fitted with adjustment devices such as turnbuckles for adjusting the alignment of the camera and the light assembly in relation to the concentrator.

A processor is electrically coupled to the camera and the light assembly and adapted for controlling the camera and each of the plurality of lights. The processor is also adapted for determining an actual angular position and an optimum alignment position for the facet based on data received from the camera relative to the illumination of the light assembly.

The present invention also includes a method for aligning a facet on a dish concentrator having a plurality of facets. Each of the facets is adapted for reflecting and concentrating an incident electromagnetic radiation to a receiver on the concentrator. Each of the facets is also adjustable to an optimum alignment orientation such that a portion of the incident electromagnetic radiation is accurately reflected to an aimpoint on the receiver.

The method includes providing a camera and light assembly having a plurality of substantially identical light sources and a camera having a lens with an adjustable iris. The camera and light assembly is supported in a fixed position spaced apart and forward from the plurality of facets.

A controller is provided and supported adjacent the camera and light assembly. The controller is adapted for controlling the adjustable iris and the illumination of each of the plurality of light sources. The controller is electrically coupled to a processor or computer having a display.

The camera is then aligned with a fixed position relative to the concentrator. This step of aligning includes supporting an alignment fixture in a fixed position relative to the facets. The alignment fixture includes a central bore which is preferably aligned along the centerline of the concentrator. A laser is also provided and supported relative to the alignment fixture such that an emitted laser beam is aligned with the centerline of the concentrator and directed into the camera. This step may require adjusting the position of the camera relative to the concentrator.

Initialization data is taken to identify and determine locations of any non-mirrored surfaces and to store those locations in the memory of the processor. After the initialization data has been taken, a plurality of locations on the reflective surface of the facet are illuminated using at least some of the plurality of individual light sources. Each of the light sources adapted to emit a light of essentially equivalent intensity, one at a time in sequence. The emitted light is reflected from the plurality of different locations on the facet and received by the camera as a plurality of light images.

The plurality of light images for each facet is stored in the processor. This information or light data includes information relating to both the light illuminated and the location on the facet reflecting the light as well as the light image received by the camera.

The light reflecting from a particular location on the facet when illuminated by one of the plurality of light sources may overlap with light resulting at that same location when illuminated by another of the plurality of light sources. A determination is first made as to whether light produced by any one of the light sources overlaps with light produced at that same location by any other of the plurality of light sources In the event that such overlap occurs, the individual light source which resulted in the greatest intensity of light from the overlapping location is identified.

The slope of the reflective surface of the facet is calculated at each location on the facet where light was reflected. This calculation is based on the relative positions between the light source that resulted in the greatest intensity of light at that location and the relative position between the facet and the location at which the light is received. This calculation yields a plurality of slope values for different locations on the reflective surface of the facet.

A line is approximated based on the slopes determined for each location on the reflective surface of the facet. The overall slope of this approximated line may then be calculated. A vertical axis intercept is calculated for the approximated line. This intercept is used to define an approximated range represented by the previously determined slope values. These values are then used to obtain the cant angle and normal for the facet, which is in turn used to determine an actual angular position of the facet.

An optimum alignment position is then determined. This optimum alignment position aligns the facet to accurately reflect the incident electromagnetic radiation to the desired aimpoint on the receiver. The optimum alignment position and the actual angular position of the facet is then compared and the difference calculated to determine an adjustment necessary to move the facet into the optimum alignment position. The facet is then moved into the optimum alignment position.

This method of aligning the facet is repeated for each of the plurality of facets on the concentrator. After each of the plurality of facets has been aligned, the entire process is repeated to ensure alignment accuracy and to correct any deviations. The entire process may be repeated as many times as required until each of the plurality of facets is aligned to the desired accuracy.

Since the present apparatus determines the orientation of the facet normal and not a reflected image centroid, the normal can be adjusted to any position without concern about a reflected light image overlapping that of another facet. Thus, there is no need to cover any of the facets when aligning each facet to a specific aimpoint on the receiver. There is also no need to rely on human judgement to determine when a light image is aligned in the theoretical profile.

The concentrator is preferably positioned at an elevation angle and orientated such that the plurality of facets are aligned with an expected maximum radiation incidence. This orientation provides for maximum energy performance at the position or angle where the facets are aligned and inherently includes the effects of gravity bending. This eliminates the uncertainty of having to calculate the effects of gravity bending analytically.

The apparatus and method of the present invention also provides an estimate of the optical shape of the reflective surface of each facet (radius of curvature and surface waviness). This information can be used to detect performance anomalies in the reflective surface such as facet debonding. The data may also be archived for future reference and comparison data.

Additionally, by obtaining reflected light images from the whole facet surface and not just a small area, the facet is accurately aligned such that the reflected solar beam power centroid is aligned to the specified aimpoint. This is accomplished through, the location of the light panel, in the number of lights, and the positions of the lights. Portability of the apparatus is enhanced by the present apparatus's light weight and small size.

The foregoing and additional advantages of the invention together with the structure and method characterized thereof, which was only summarized in the foregoing passages, will become more apparent to those skilled in the art upon reading the detailed description of the preferred embodiments of the invention, which follows in this specification, taken together with the drawings hereof presented herein.

BRIEF DESCRIPTION OF THE DRAWINGS

FIG. 2b is a side view of the camera and light assembly as shown in FIG. 2a;

FIG. 2c is a rear view of the camera and light assembly as shown in FIG. 2a;

FIG. 7a is a chart representing an example of a composite light intensity file;

FIG. 7b is a chart representing an example of a composite light number file;

FIG. 12b is a flow diagram of a subroutine identified in FIG. 12a;

FIG. 12c is a flow diagram of another subroutine identified in FIG. 12a; and

The invention, together with additional features and advantages thereof, may be best understood by reference to the following description where like numbers will be used to represent like parts.

DESCRIPTION OF THE PREFERRED EMBODIMENTS

Figure 1:
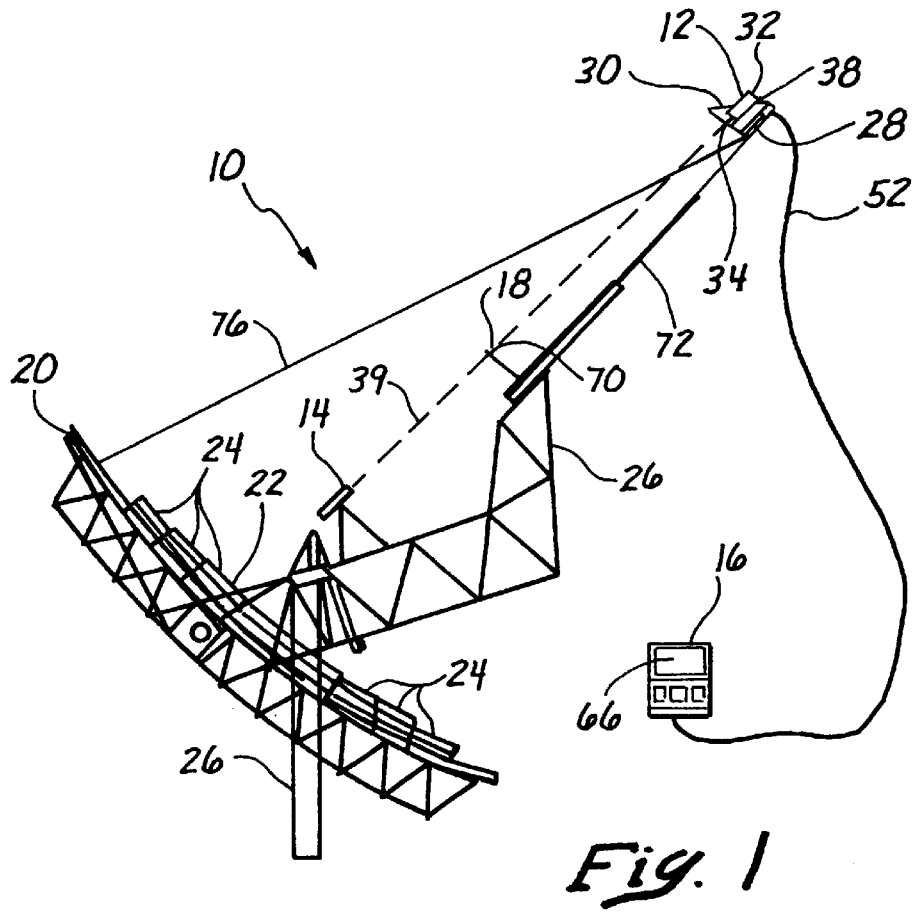
FIG. 1 is a diagram of an embodiment of the present invention shown installed on a dish concentrator.

Referring to FIG. 1 an apparatus for aligning facets on a dish concentrator having the features of the present invention is shown installed on a dish concentrator. The facet alignment system 10 generally includes a camera and light assembly 12, an alignment device assembly 14, an operator controller 16, and an alignment fixture 18.

The facet alignment system 10 is shown installed on a typical dish concentrator 20 having a paraboloidal reflective surface 22 made up of individual facets 24, each having a reflective surface. The typical dish concentrator 20 has a frame structure 26 extending to a receiver location 28 for supporting a receiver (not shown) that may be preferably removed during alignment operations.

Figure 2A:
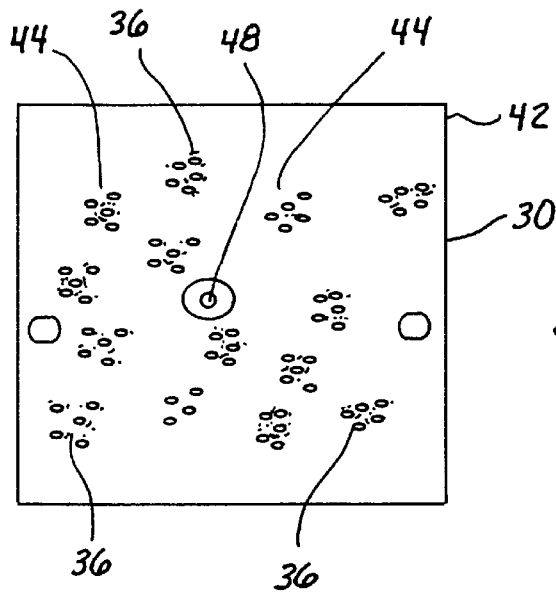
FIG. 2a is a front view of an embodiment of the camera and light assembly of the present invention showing the light panel.
Figure 2B:
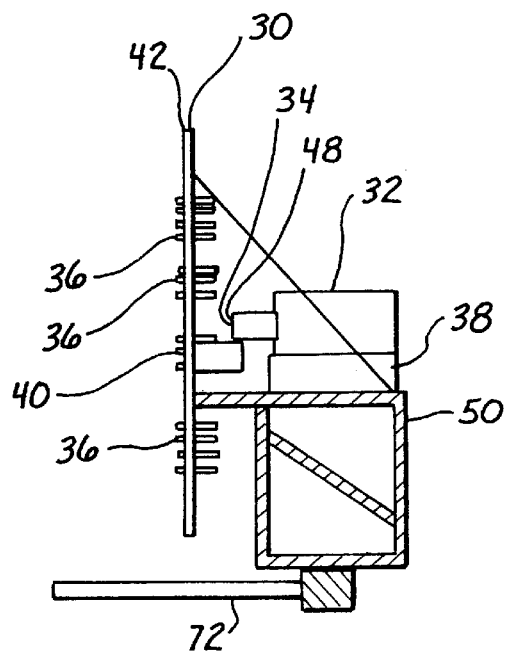
Figure 2C:
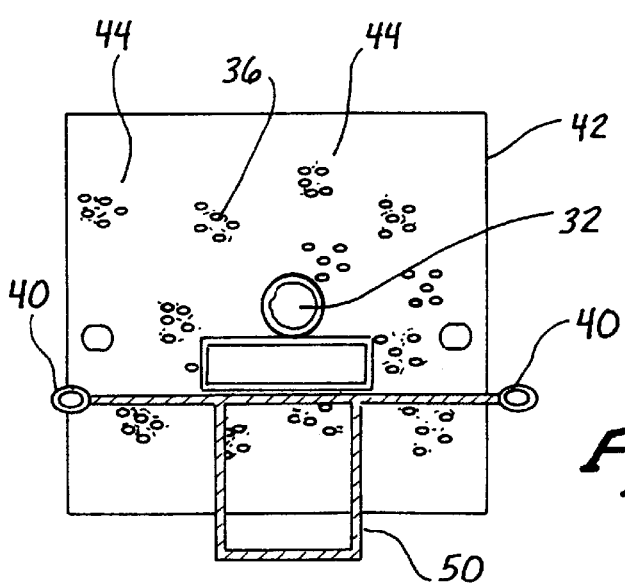

Referring now to FIGS. 2a, 2b and 2c, the camera and light assembly 12 is shown in greater detail. The camera and light assembly 12 generally includes a light panel 30, a camera 32, lens 34, a plurality of light sources 36, secondary light sources 40 and a camera and light controller 38. The camera and light assembly 12 may preferably be mounted at the radius of curvature of the facets 24 which is generally twice the focal point of the concentrator 20. However, the camera and light assembly 12 may be mounted in most any position along a general centerline 39 the concentrator 20 in a spaced apart fashion from the facets 24.

The light panel 30 may include the plurality of spaced apart light sources or even a light source array 36 and may be mounted on a suitable frame 42 for emitting the light against the reflective surface of the desired facet 24. Preferably, the light panel 30 is made from at least two individual panels 44 which are mated together and supported by the frame 42. This increases the portability of the camera and light assembly 12 by reducing its overall disassembled size. Alternatively, the light panel 30 and the camera 32 may be provided separate components.

Referring now in particular to FIG. 2A, a front view of the light panel 30 is illustrated showing the locations and spacings of the plurality light sources 36. The light sources 36 may be mounted in a specific pattern or configuration which is specifically adapted for specific types of facets 24. This particular arrangement of the light sources 36 provides illumination of the reflective surface on each desired facet 24 from various angles so as to generally completely illuminate the facet 24. Thus, the light panel 30 may be configured for a specific dish concentrator 20 having specific facets 24 such that the light sources 36 are arranged to illuminate the entire reflective surface of each of the facets.

Light sources 36 may be LED or equivalent lights. Preferably the lights will be approximately 3/16 inches or less in diameter. Preferably, the light sources 36 should all have essentially the same intensity level and should illuminate virtually the entire concentrator. Thus, the light source intensity should be relatively uniform over the entire viewing angle relative from any point on the concentrator reflective surface 22. This insures that the light intensity level reflected from any fully illuminated location on the reflective surface 22 of the concentrator 20 does not vary because of its location or because of the particular light source 36 producing that reflection. However, light sources 36 having other sizes may be utilized. Additionally, other sources of light 36 may also be used, such sources may include: LCDs, incandescent lights, gas discharge lights, electroluminescent panels, video monitor illuminated panels or similar.

Other forms of energy such as electromagnetic radiation, including IR, may be used. Use of these forms of energy may require the use of a suitable wave length bank camera or pixel addressable sensor. Preferably, these light or other energy sources 36 are positioned a sufficient distance apart from the facets 24 that each facet 24 may be fully illuminated or radiated. The plurality of light or electromagnetic radiation sources 36 may each be individually mounted from the back of the light panel 30. Mounting the light sources 36 in this way reduces or eliminates any light reflection off an adjacent individual light source 36 which could result in an extraneous reflection off a facet 24.

As previously described, the light panel 30 may comprise two individual rectangular light panels 44 that are assembled together to form a larger panel 30, which is preferably square. The light panel 30 may advantageously be approximately two feet high by two feet wide or, if round, approximately two feet in diameter. This generally provides sufficient illumination ability, yet is small enough to be readily portable. However other sizes and shapes may also be used, depending on the lighting sources 36 used, the facets 24 being aligned and the accuracy of alignment desired. By using a plurality of rectangular individual panels 44 to form the light panel 30, the overall size of the light panel 30 is reduced and portability increased.

The light panel 30 may be constructed from circuit board material and the frame 42 may preferably be made from aluminum, steel, plastic or other more rigid material. However, most any materials may be used that are lightweight, strong and preferably of low reflectivity.

The camera 32 is preferably a modified video camera designed and positioned to receive the light or radiation emitted from the each of the plurality of light sources 36 and reflected from the facets 24. The camera 32 is preferably supported relative to the concentrator 20 in a position generally facing and approximately perpendicular to the facets 24. The light emitted from the each of the plurality of light sources 36 generally strikes the desired reflective surface of the facet 24 and is reflected off the facet 24 along a normal vector 46. This normal vector 46 generally determines where the reflected light will strike the camera 32. Surface curvature and surface irregularities on the reflective surface of each of the individual facets 24 affect the angles at which the reflected light or radiation from each of the light sources 36 will be reflected and thus the location received by the lens 34 of the camera 32.

The camera 32 may be an off-the-shelf type video camera. More specifically, the camera 32 may be a typical CCD camera with a lens 34 having an adjustable iris and with 512 by 512 to 1024 by 1024 pixels resolution or higher. However, the number of pixels may be different and a higher resolution may even be preferable. The camera 32 is modified to function as a radiometer by disabling the automatic gain control circuits, the auto focus, the auto iris, the anti blooming circuits and any other gain loop circuits. Additionally, measures should be taken to insure that the camera maintains a constant response to a constant incident illumination, such as the use of a constant temperature enclosure or feedback control loop that maintains a constant black level in a peripheral region of the camera. Other cameras and modifications may be used, however, it is preferable to have the camera 32 function as a radiometer.

The lens 34 preferably has a fixed focal length, a fixed focus and a fixed field of view. These parameters may preferably be configured specifically for the size of concentrator 20 being aligned. The camera 32 may have a variable iris opening 48 which may be controlled by the camera and light controller 38.

The camera and light controller 38 is a processor which may be adapted to control the iris opening 48, other camera 32 operations, and the sequential operation or other order of illuminating the plurality of lights 36 as well as any secondary light sources 40. The camera and light controller 38 is generally in electrical communication with the operator controller or processor 16 through cable 52 or other electrical communication devices such as electromagnetic communication. The cable 52 may preferably contain a fiberoptic line for communication between the two controllers 38 and 16. Information transmitted over this communication line 52 includes commands, status, information, and measurement data. Electrical power may also be supplied to the camera and light assembly 12 through cable 52 from the operator controller 16 or directly from a power supply or source.

Upon command from the processor 16, the camera and light controller 38 may adjust the iris opening 48, turn on or off a particular light source 36 or 40, and may actuate the camera 32 to take an image of the concentrator 20 or the reflected light from the facet 24. Alternatively, the operations of the camera and light controller 38 may be incorporated into the main processor or operator controller 16.

The secondary light sources 40 may be used to illuminate the entire concentrator 20 surface during the alignment system 10 setup and when acquiring initialization data. Preferably, these secondary lights 40 include a pair of spaced apart lights 40 that may be operated in a strobe fashion, if required, or be turned on and off on command. These secondary light sources 40 may be flood type lights, strobe lights or similar which are preferably operable on the available power supply delivered to the camera and light assembly 12.

Figure 3:
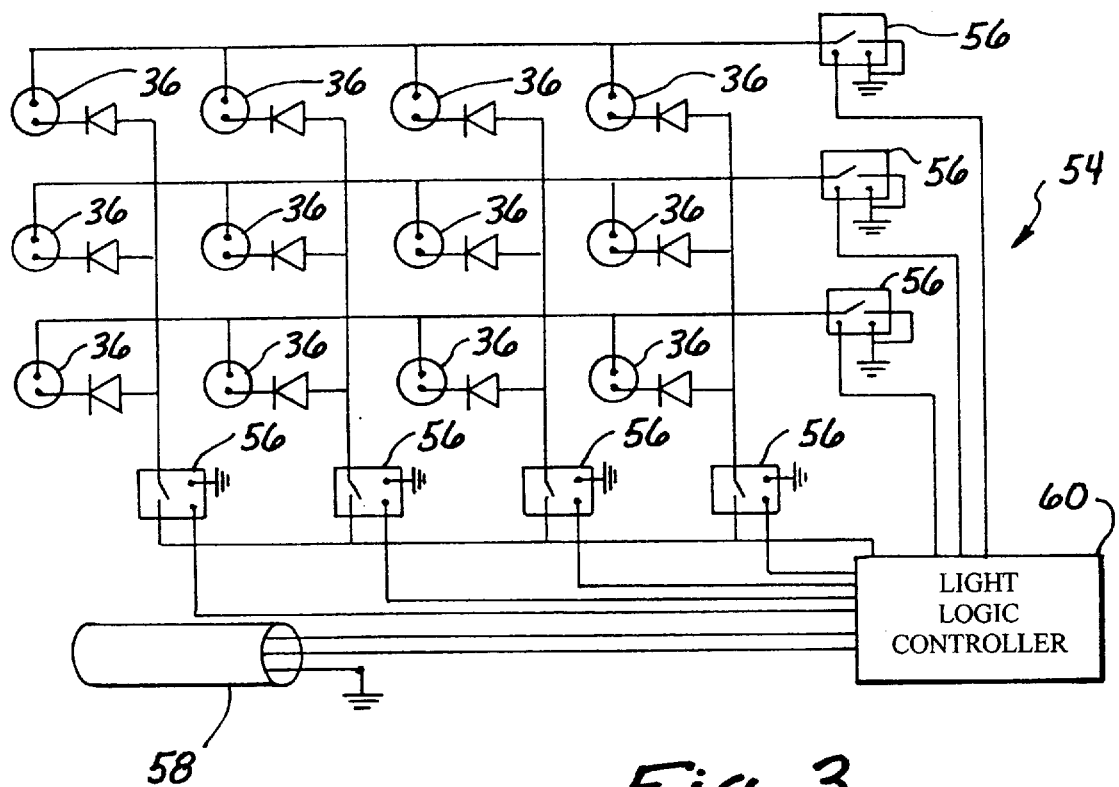
FIG. 3 is a diagram of an embodiment of a three by four light switcher logic of the present invention.

Referring now to FIG. 3, a light switcher 54 may be used to control the on/off switching of each of the plurality of light sources 36 on the light panel 30. The light switcher 54 may be a matrix light switcher and operate in conjunction with each of the plurality of light sources 36 which may be electrically connected in an x-y matrix configuration. Relays 56 may be used to connect each wired row of light sources 36 to ground and also to connect each wired column to a power supply 58. Each light source 36 may be fitted with a diode or the like to prevent multiple lights sources 36 from coming on when either a row or column is energized.

The light switcher 54 may be mounted on the light panel 30 or even incorporated into the camera and light controller 38. Using a light panel 30 made from a PC board or similar material may simplify the wiring of the light sources 36 and the light switcher 54. The power supply 58 may be a battery connected to the light switcher 54 through electrical wiring. Power may also be provided by a generator, from a power source available at the site, or by any other method as is known. A typical supply voltage may be 1.5 volts direct current.

A light logic controller 60 may be used to receive messages and execute commands input by the operator controller 16 and the camera and light controller 38 by energizing the appropriate relays 56 on the light switcher 54. The light logic controller 60 may also be incorporated as part of the light switcher 54.

Referring back to FIGS. 2B and 2C, a frame assembly 50 supports the camera 32 in relation to the light panel 30. This frame assembly 50 may also support the camera and light controller 38 and at least one secondary light source 40. The camera 32 is preferably centered within the light panel 30. Preferably, the camera 32 is mounted just behind a hole formed in the center of the light panel 30. This configuration generally allows the most effective illumination of the desired facet 24, but other camera 32 locations may be used.

For example, when aligning facets 24 on an off axis paraboloidal concentrator, the plurality of light sources 36 and camera 32 may be arranged differently. The camera 32 may be located alongside or apart from the light panel 30. The choice of camera 32 location in this case is determined by several factors, such as minimizing the total light panel 30 area and obtaining locations for the camera 32 and light panel 30 that allow access to all of the facets 24.

Referring back to FIG. 1, the alignment device 14 includes an alignment laser 62 which may be mounted on a laser support 64. The laser 62 may preferably be a pencil beam laser with a low divergence and a high degree of angular stability. However, almost any optical laser is generally adequate. The laser support 64 may be a tripod type support that is designed such that the centerline of the emitted laser beam will be at the same height and coaxial with a centerline 39 of the concentrator 20, the alignment fixture 18 and the camera 32. The laser support 64 may include adjustment devices to allow alignment of the laser beam with a central bore 70 in the alignment fixture 18. Alternatively, or in addition, the laser 62 may be fitted with adjustment devices. The laser support 64 may be placed on the frame structure 26 of the concentrator 20 but may also be placed on the ground, on a vehicle, or on any other support that is appropriately located between the concentrator 20 and the alignment fixture 18.

The operator controller 16 generally consists of a computer or other processor. The computer may be a small battery powered computer for increased system portability, such as a lap top computer or a body mounted computer with a small battery pack. The body mounted computer or body integral computer is in principal, similar to a large class of computers having small lightweight processors with data acquisition systems, head-mounted displays, radio frequency data transmission capability and other peripheral computer hardware capability. Typical processors suitable for this task include Intel Pentium processors and other similar processors or computers having such processors. In general, an operator enters commands into the processor 16 through an associated keyboard or other data entry method, such as by verbal commands, and views information displayed from the computer screen or monitor 66. When the processor 16 receives information from the camera 32, it interprets the data and displays it in a user useable fashion on the monitor 66.

The alignment fixture 18 is used to ensure that only valid data will be obtained and that the facets 24 will be properly aligned. The alignment fixture 18 includes a fixture having a generally cylindrical central bore 70 which is aligned to be coaxial with the concentrator centerline 39. Generally, the alignment laser 62 and the facet alignment fixture 18 are aligned on the concentrator centerline 68, however, in some applications, such as when aligning off-center concentrators, they may be located off of the concentrator centerline 39. The cylindrical bore 70 is generally located at the focal point of the concentrator 20 and is aimed at the lens 34 of the camera 32. The alignment fixture 18 may be mounted on the frame structure 26 of the concentrator 20 or separately supported.

During use, the alignment laser 62 is adjusted until the emitted laser beam passes through the cylindrical bore 70 in the alignment fixture 18, and is received into the lens 34. If wind, vibrations, or other disturbances cause the laser beam to deviate from the bore 70, then the image grab from the camera 32 will not contain a spot of light at the expected location. The processor 16 may delete or otherwise discard any data taken and any computations using that data and require that the tests be repeated. In this way, only valid data will be obtained and used. During a longer test, such as with a large concentrator 20 having many facets 24, the bending due to gravity may change as the concentrator 20 is adjusted during the day. This bending of the concentrator 20 may require additional compensating adjustments of the laser beam.

Alternatively, a facet 24 located at the concentrator centerline 39 may be used to reflect the beam from the alignment laser 62 into the camera 32 when the concentrator 20 is in a stable and motionless state. When wind or other disturbing forces cause the frame structure 26 to vibrate relative to the facet 24, the reflected laser beam will not enter the camera lens 34, or only a part of the beam will enter. The resulting decrease in light intensity (or, a total loss of the laser beam reflected light) would be noted by logic of the processor 16 and data taken during that period eliminated.

Either of these procedures ensure that consistent alignment data is obtained for the same relative position of each of the plurality of light sources 36 and the facets 24, even though wind induced forces may cause momentary deflections of the frame structure 26 relative to the facets 24.

Figure 4:
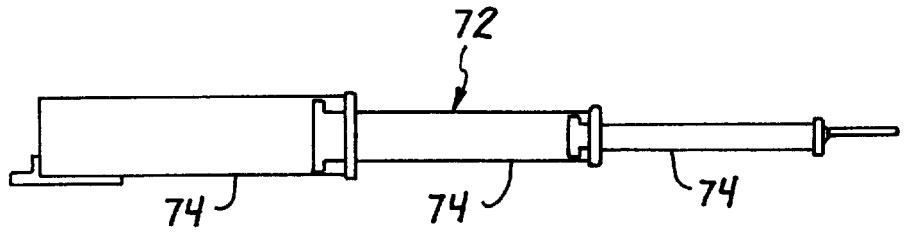
FIG. 4 is a cross sectional view of an embodiment of a telescoping support member of the present invention.

A support member 72 may be used to support and position the camera and light assembly 12 in relation to the concentrator 20. The support member 72 may preferably be a telescoping or other collapsible member which includes a plurality of concentric pieces 74 or other extendable and collapsible pieces that fit inside each other as illustrated in FIG. 4. Thus, the support member 72 may be collapsed such that it is readily portable. Alternatively, the support member 72 may include connectable pieces or simply be a non-extending single piece member. The support member 72 may be connected to the frame structure 26 at one end and attached to the camera and light assembly 12 and particularly, the frame 50, at the other end. Generally, the support member 72 supports and positions the camera and light assembly 12 along the concentrator centerline 68 at twice the focal length of the concentrator 20. Alternatively, the support member 72 may not be necessary if the camera and light assembly 12 are otherwise supported relative to the concentrator 20.

A plurality of positioning cables 76 may be used to align the camera and light assembly 12 in relation to the concentrator 20. The positioning cables 76 may be attached to the camera and light assembly 12 at one end and to the frame structure 26 at the other end. Each of the positioning cables 76 may include an adjustment device for adjusting the length of the positioning cable 76 and thus moving the camera and light assembly 12 until the camera 32 is centered and identifies the laser beam through the cylindrical bore 70 in the alignment fixture 18. The positioning cables 76 may be attached to the concentrator frame structure 26 at spaced apart locations to allow positioning in both the vertical and horizontal directions. The adjustment device may be a turnbuckle, a tightening bolt with a through hole, a cinching device, or any other method as is known in the art.

Figure 5:
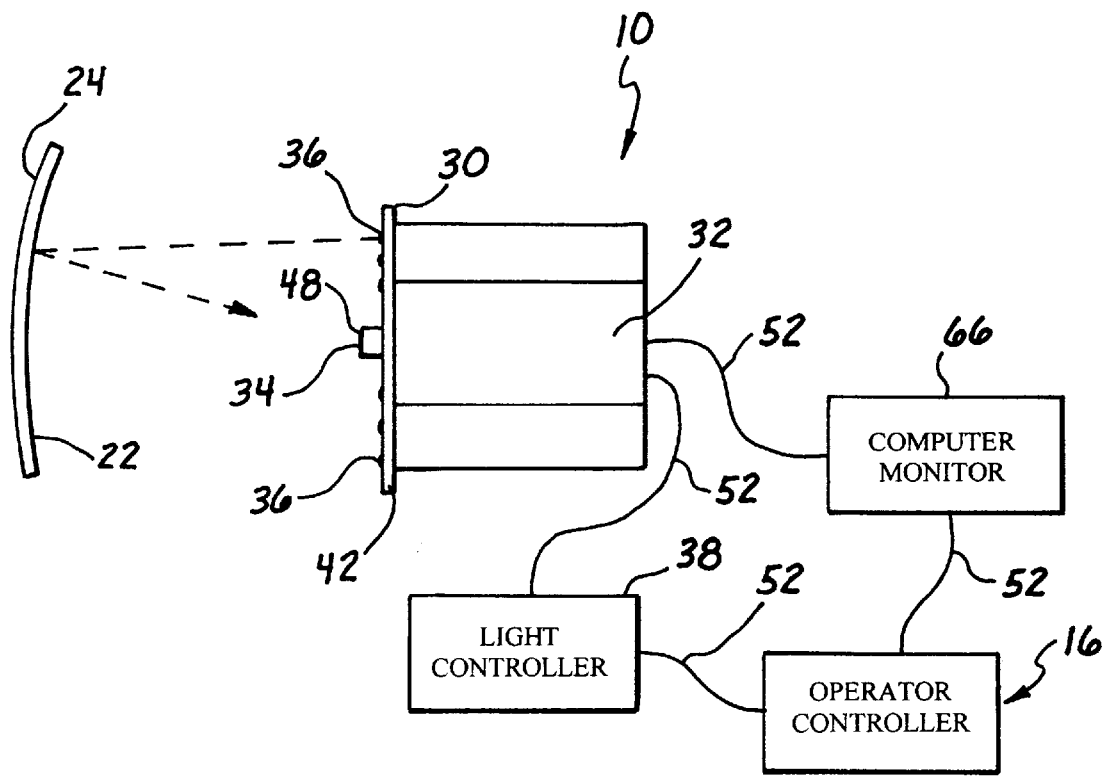
FIG. 5 is a diagrammatic view of an embodiment of the present invention specifically showing the camera, the light source array, the operator controller and also showing a facet being aligned.

Referring now to FIG. 5, a diagram of an embodiment of the alignment system 10 is shown with the camera 32, the light panel 30 and plurality of light sources 36 in electrical connection with the camera and light controller 38 which is in connection with the operator controller 16 and the monitor 66 through cables 52. The cables 52 may include fiber optic, as well as electrical wiring lines. However, the cable 52 may also include coaxial cables. The plurality of light sources 36 are shown emitting a light which is reflected from the reflective surface of the facet 24 and onto the lens 34 of camera 32.

In a method of the present invention, facets 24 on a dish concentrator 20 may be precisely aligned using an apparatus, such as the apparatus described in this specification. The method may include first removing any extraneous components from the concentrator 20. These components, such as the receiver or the engine, are removed to enable a full view of the inner facets 24 by the camera. A weight may be used to replace the mass of the removed components and to mimic actual concentrator 20 conditions. This way, the gravity moment on the concentrator 20 and associated bending will be equivalent.

The support member 72 and alignment fixture 18 may be attached or otherwise supported relative to the frame structure 26. The support member 72 may be attached to the frame structure 26 where the receiver is attached. However, a remote support member 72 may be used to support the equipment relative to the concentrator 20 without requiring attachment to the frame structure 26. The alignment fixture 18 may preferably be attached such that the cylindrical central bore 70 is generally coaxial with the concentrator centerline 68. Attachment may be made through clamps, bolts, screws, straps, or any other method of attaching equipment to a frame structure.

The alignment device 14 is supported relative to the concentrator 20 such that the laser 62 is generally at the same height as the concentrator centerline 39. The alignment device 14 may be mounted on the frame structure 26 or elsewhere as previously described. An initial adjustment is performed to align the laser beam such that it passes through the cylindrical bore 70 in the alignment fixture 18 and into the lens 34.

The concentrator 20 may be positioned at an elevation angle (rotated downward) such that the support member 72 is extended or extends to the ground. The camera and light assembly 12 may be assembled and attached to the end of the support member 72 that is resting on the ground. The positioning cables 76 may be attached to the concentrator 20 at one end and the support member 72 or camera and light assembly 12 at the other end. The positioning cables 76 may then be adjusted to further support and fixedly position the camera and light assembly 12 relative to the facets 24.

The operator controller 16 is electrically connected to the camera and light assembly 12 using cables 52. This connection includes connections with the camera and light controller 38, the light switcher 54 and the monitor 66. The alignment system 10 may then be powered up and the operation of each component checked.

The elevation and orientation of the reflective surface 22 of the concentrator 20 may preferably be adjusted to re-orient the facets 24 so they are aligned with an expected maximum energy generation or of maximum radiation incidence.

Light images received by the camera 32 are displayed on the monitor 66. The positioning cables 76 may be readjusted until the emitted laser beam is positioned in the center or other desired location in the camera 32.

An initialization procedure is generally necessary to exclude non-valid data from any non-mirrored or otherwise non-reflective surfaces. Determining this initialization data includes using the secondary light sources 40, which may be strobe lights, to get an image of the entire concentrator 20. The operator controller 16 synchronizes the image grab from the camera 32 with the secondary lights 40 or any other light source for illuminating and getting a clear image of the concentrator 20. The camera iris opening 48 may also be adjusted to get a clear image. Alternately, the entire plurality of lights 36 on the light panel 30 may be turned on and the iris opening 48 adjusted for the appropriate dynamic range of brightness. This operation establishes the location of the corners and edges for each of the facets 24 and the location of any non-mirrored surfaces.

Figure 6:
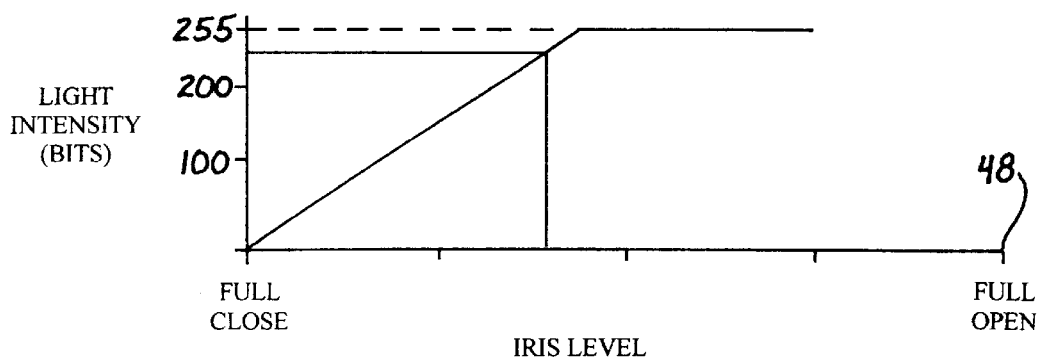
FIG. 6 is a graph representing a calibration curve used for setting the iris level in the camera.

The iris opening 48 is set and several of the plurality of lights 36 are turned on and off. Additional images are taken with the iris opening 48 adjusted to different levels. A calibration curve of the received intensity versus iris opening 48 level is calculated by plotting the received light intensity over the iris opening 48 level. An example of a typical intensity calibration curve is shown in FIG. 6. Using this intensity calibration curve, the iris opening 48 may be set to a level that results in a peak received intensity. For example, a received intensity of approximately 245 bits for an 8 bit system having a dynamic range of approximately 0–256.

An alternate method of system initialization may include turning on all of the plurality of lights 36 and adjusting the iris opening 48 level such that the peak intensity is say 245 bits. It is generally preferable to use the plurality of light sources 36 which are generally "pin point" light sources of essentially equal brightness, and with an illumination angle which generally covers all of the concentrator 20.

Data on the light image may preferably be obtained by first taking an image grab without any of the plurality of lights 36 turned on. Next, a single light 36 from the plurality of lights is turned on and after a brief period, another image is taken. The period may be on the order of approximately one second but any other period may be used. This background image may then be subtracted from these light images to determine the actual light images and the background level of light intensity.

The resulting array of pixel intensities is determined and compared to the maximum composite file. If a pixel in the new image file is larger than the intensity stored in the maximum intensity composite file, the new intensity is stored in the light composite file and the light number is stored in another composite file as shown in FIGS. 7a and 7b. The process is repeated for each light 36 of the plurality of lights 36.

The initialization procedure for identifying non valid data as described above is used to delete any extraneous light that occurs at the corners and edges of the facets 24 due to glare, non-mirrored surfaces as well as from any slight movements of the facets 24. To ensure that the concentrator 20 does not move relative to the camera and light assembly 12, the camera and light controller 38 must identify the laser beam from the laser 62 in the camera 32 for each image grab. Using the laser 62 to ensure constant alignment between the camera 32, the plurality of light sources 36 and the plurality of facets 24, also makes it possible to quantify facet 24 deflections due to external forces such as wind.

Once all of the measurement data or light data has been taken for each of the plurality of lights 36 relative to the facet 24, data processing may begin. In the first step of the processing, the light corners that were previously obtained during the initialization procedure are used to define the measurement or light data for each facet 24. This ensures that extraneous light data from outside the facet 24, such as non-mirrored surfaces from the concentrator structure 20, are not used to determine the angular position of the facet 24.

Figure 8:
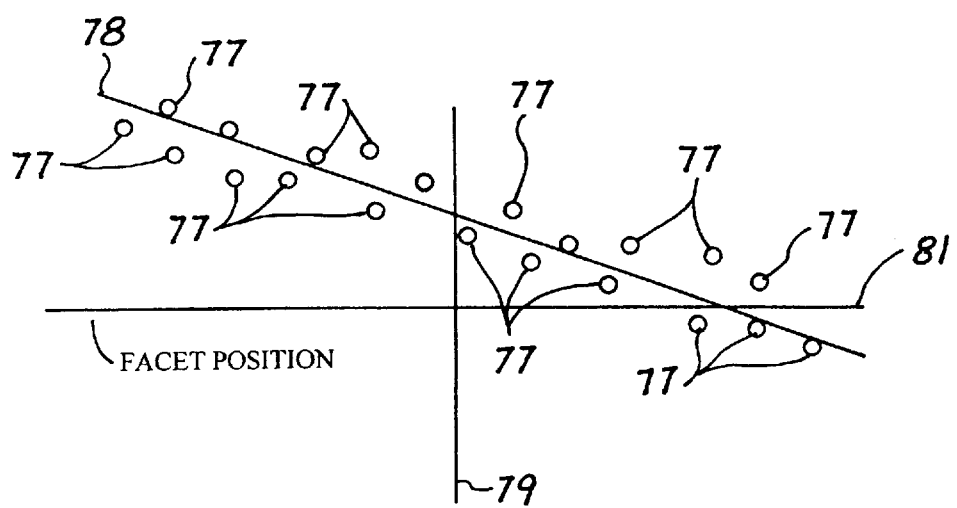
FIG. 8 is a graph of data points for each pixel that received light showing the facet normal in terms of cant angles.

Using the operator controller 16 in conjunction with the camera and light controller 38 as described, the facet normal 46, in terms of an angular slope or cant angle 77, is calculated for each location on the facet 24 that received and reflected light. An example of the processed data is shown in FIG. 8 which shows an approximated data line 78 fitted to the data points representing each of the determined angular slopes 77 on the facet 24 relative to determined cant angle axis 79 and a facet position axis 81. The data line 78 may be determined using a least squares method of approximation to fit the data points 77, but other methods as are known in the art may also be used.

An intercept between the data line 78 and the cant angle axis 79 defines the facet normal and the actual angular position of the facet 24. This facet angle is compared to an optimum alignment position for the facet 24 and the difference is used to calculate the necessary adjustments required to align the facet 24. The processed data may be displayed on the monitor 66 and may include specific instructions on how to adjust each of the facets 24. As an example, displayed adjustment data may read "for facet 82, turn bolt number 1, 1.5 turns CW." Any adjustments may depend on the mounting geometry of the facets 24 on the concentrator 20.

Processing of the data may generally be accomplished within the operator controller 16 in conjunction with the procedures described above. The operator controller 16 may incorporate the use of a software program 82 or other software coding which performs the discussed calculations and will be described in further detail below.

The required adjustments are made to the facet 24 and the process is repeated for each of the remaining facets 24. A second set of light data measurements may then be taken and if any facet 24 is found to be out of tolerance, it is adjusted again. This process is repeated until all of the facets 24 are aligned to the required accuracy.

In an alternative configuration, each facet 24 may be adjusted automatically rather than manually This method would save time and thereby reduce costs. In this embodiment, a servo mounted wrench (not shown) may be attached to a facet mounting adjustment device. The facet mounting adjustment device is attached to and can move each facet 24 in relation to the concentrator 20. The adjustment device may be a stud and bolt assembly, adjustment screw, piston, or an other means of adjusting facets 24 or similar plates on a panel. Each servo may be connected to the operator controller 16. When the operator controller 16 has calculated the necessary adjustments for a particular facet 24, the servos may be pulsed the required amount such that the facet 24 is aligned. Alternatively, the alignment of each facet 24 may be achieved through the use of pneumatic or hydraulic cylinders, mechanical cam or lever systems, or any other similar method which is directed to move each facet 24.

One important feature of the present alignment system 10 and method is the ability to align each facet 24 to the optimal alignment position for obtaining the maximum power. The system and method may also advantageously align each facet 24 to a different aimpoint on the receiver of the concentrator 20 without having to cover any of the plurality of facets 20. These features are accomplished by specifically locating the plurality of lights 36 in the light panel 30 for the specific type of concentrator 20 being aligned. Thus, the configuration of the lights 36 would differ for rectangular, square or triangular facets 24.

Figure 10:
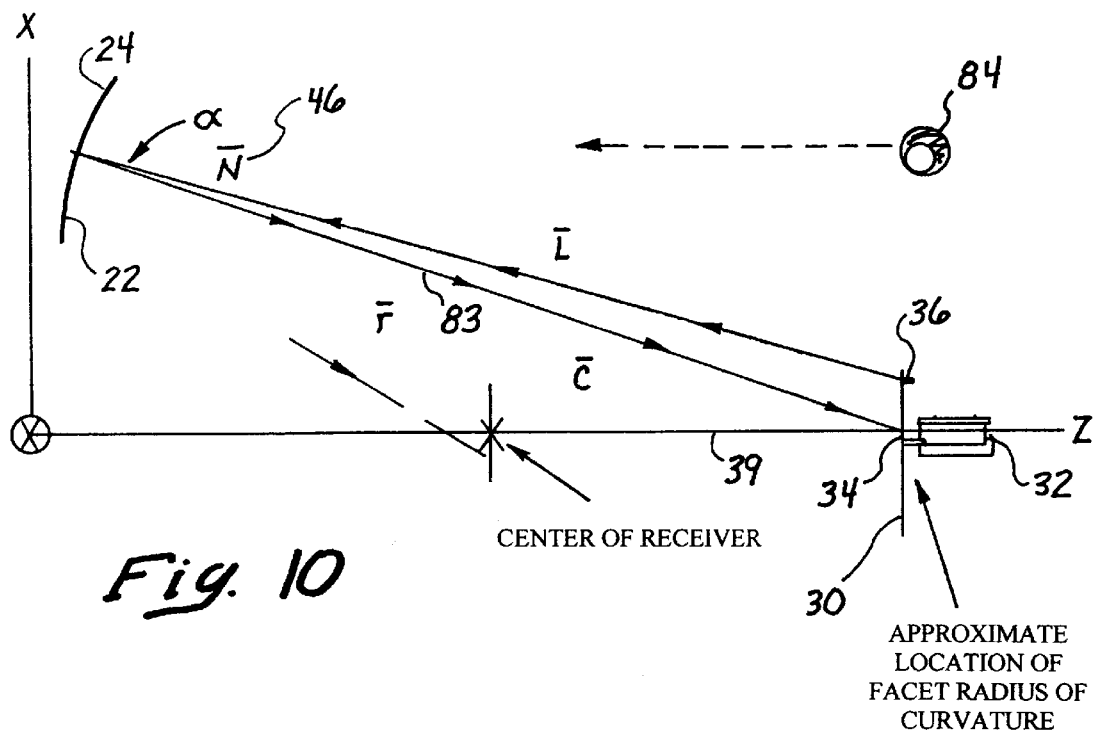
FIG. 10 is a diagram illustrating the trigonometric relationships when using the camera and light assembly of the present invention to measure a facet normal.
Figure 9:
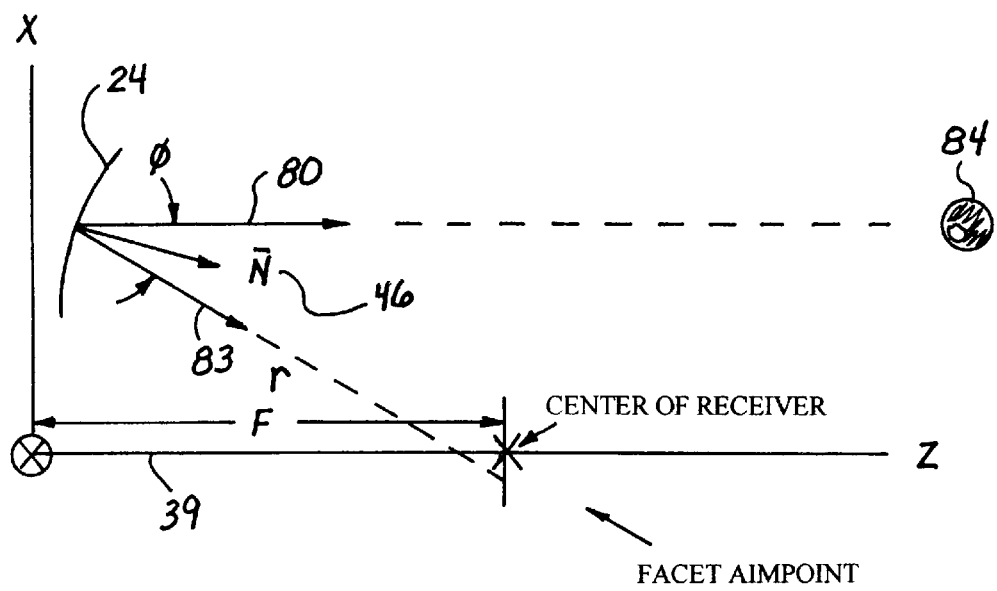
FIG. 9 is a diagram illustrating the trigonometric relationship when using solar rays to obtain a reflected beam on a specified aimpoint.

Referring now to FIGS. 9 and 10, the calculations required for aligning each facet 46 such that the sunbeam or other incident ray or beam will be reflected so that the centroid of the beam will be centered on the desired aimpoint will generally and broadly be discussed. As mentioned, these calculations are preferably performed using the DIR Alignment Program; 82, which has been loaded into the operator controller 16.

To accomplish the alignment of each facet 24, the facet normal vector 46 must be determined and then placed halfway between an incident vector, such as an incident solar vector 80 and the associated reflected vector 83. In other words, the angle between the facet normal vector 46 and the incident vector 80 must equal the angle between the facet normal vector 46 and the reflected vector 83. The relationship between an incident vector 80 and a reflected vector 83 may be interpreted through Snell's law of reflection and may be expressed as:

$$N = \frac{s+r}{2\cos(f/2)}.$$

where

N=the facet normal
s=the incident unit vector
r=the reflected unit vector
f=the angle between the unit vectors s and r.

For a coordinate system located at the facet 24 with the z axis pointing at the source of incidence 84 (the sun) and the x axis perpendicular to the concentrator centerline 68 in the upwards direction, the vectors r and s (80 and 83) can be expressed as:

s=s3 k=k (unit vector)
r=r1 i+r2j+r3 k where the reflected vector (r) is given by:

$$r = \frac{(xf-xr)i + (yf-yr)i + (zf-zr)k}{SQRT((xf-xr)^2 + (yf-yr)^2 + (zf-zr)^2)}$$

calculating the location of the facet 24 depends upon the construction of the concentrator 20, and is affected by the number of facets 24 as well as their shape, size curvature and mounting position on the concentrator 20 The angle between the two vectors (f) can be found from the dot product:

cos(f)=s*r=(s3)(r3)=r3
f=cos$^{-1}$(r3)

Thus, the required facet normal vector 46 would be:

$$N = \frac{s+r}{2\cos(f/2)} = \frac{r1i + r2j + (r3+s3)k}{2\cos(f/2)}$$

where f was defined above.

Referring now specifically to FIG. 10, the facet 24 can be aligned by locating the camera and light assembly 12 near the radius of curvature of the facet 24. In this fashion, the actual facet normal vector 46 is given by the expression:

$$N = \frac{1+c}{2\cos(a/2)}.$$

where
N=the facet normal vector 46
l=a unit vector pointing at the source of incidence 84 from the facet 24 which in this case is a single light 36 on the light panel 30.
c=a unit vector pointing at the camera 32.
a=the angle between the facet normal and unit vector c and l.

Where the unit light vector (l) is:

$$l = \frac{(xf-xl)i + (yf-yl)j + (zf-zl)k}{SQRT((xf-xl)^2 + (yf-yl)^2 + (zf-xl)^2)}$$

and the camera unit vector (c) is:

$$c = \frac{(xf-sc)i + (yf-yc)j + (zf-zc)k}{SQRT((xf-xc)^2 + (yf-yc)^2 + (zf-zc)^2)}$$

The location of the light vector (l) can be found by rearranging the above described equation for the actual location of the facet 24 as:

l=2N cos(a/2)−c where N was determined as the required facet normal vector 46. The angle (a/2) can be found by taking the dot product of the required facet normal vector 46 written as:

n=n1i+n2j+n3k with the camera vector (c). The value of cos(a/2) is:

cos(a/2)=n1c1+n2c2+n3c3=n3c3 since the camera is located on the z axis (centerline of the concentrator 20). The location of the light vector (1) is:

$$\frac{(l1-xf)i+(l2-yf)j+(l3-zf)k}{lfMAG}=AAA$$

where
$AAA=(2n3\ c3\ n1-c1)i+(2n3c3\ n2-c2)j+(2n3\ c3\ n3-c3)k$
$lfMAG=SQRT((xf-l1)^2+(yf-l2)^2+(zf-l3)^2)$ $$\frac{(l1-xf)}{lfMAG}=(2n3c3n1-c1)$$

$$\frac{(l2-yf)}{lfMAG}=(2n3c3n2-c2)$$

Since the location of the camera and light assembly 12 and particularly the source of incidence or light panel 30 is known in the z direction (l3), the equation can be solved for lfMAG and:

$$lfMAG=\frac{(l3-zf)}{(2n3c3n3-c3)}$$

The x and y location of the light l1 & l2 are:

$$l1=xf+\frac{(2n3c3n1-c1)*(l3-zf)}{(2n3c3n3-c3)}$$

$$l2=yf+\frac{(2n3c3n2-c2)*(l3-zf)}{(2n3c3n3-c3)}$$

If each facet 24 was without surface errors or imperfections and each of the plurality of light sources 36 and the camera 32 were located exactly at the radius of curvature of the facet 24, then a single light 36 would fill up the entire facet 24. However, this is seldom the case. Each pixel of light that the camera 32 receives from an individual light source 36 provides information about the orientation of a portion of the facet 24. The position of the light reflection can be determined by knowing the position of the facet 24 with respect to the camera 32. This relationship is further described in U.S. Pat. No. 5,477,332. From this measurement data, the facet normal vector 46 for each camera pixel element can be calculated by the operator controller 16 or other processor and can then be used to calculate the best estimate of the facet normal 46. As previously described, the best estimate may be determined using a least squares method. The resulting estimate is an angle that represents the majority of the surface of the facet 24.

Since each facet 24 will likely have some surface waviness or other imperfections and the actual reflected light will not be reflected to the exact radius of curvature of the concentrator 20 when each of the facets 24 has a different aimpoint location, the facet 24 may not be filled with light when a single light 36 of the plurality of lights 36 is used. To ensure that sufficient measurement or light data is obtained over the entire surface of the facet, multiple lights 36 may be used for the alignment of each facet 24.

The large amount of data obtained ensures that the surface of the entire facet 24 is considered and not just a portion. Therefore, the facet 24 may be adjusted until the reflected beam centroid is aligned to the desired aimpoint.

Figure 11A:
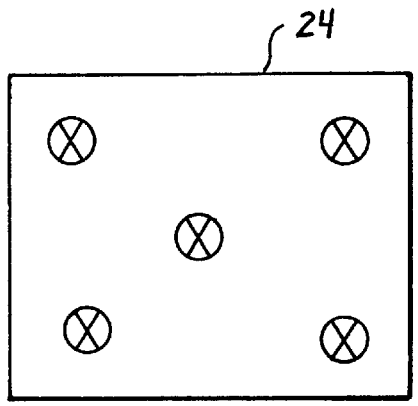
FIG. 11a is a diagram showing locations of illumination on a reflective surface of a square facet being aligned using an embodiment of the present invention.
Figure 11B:
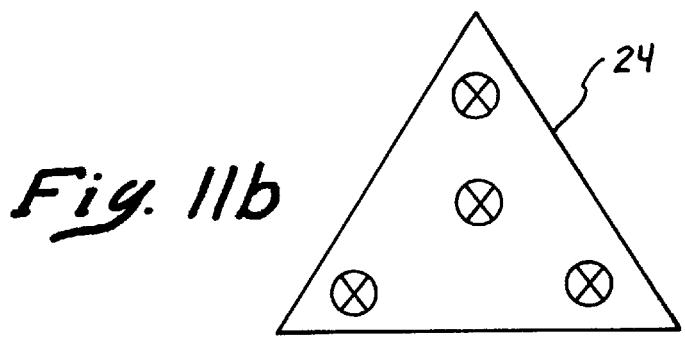
FIG. 11b is a diagram showing locations of illumination on a reflective surface of a triangular facet being aligned using an embodiment of the present invention.

The location of the plurality of lights 36 in the light panel 30 is preferably configured for the specific type of concentrator 20 being aligned. FIGS. 11a and 11b illustrate preferable locations of the lights 36 as reflected from the surface of a square and triangular shaped facet 24. Alternatively, any desired set of locations may be used depending on the type of concentrator 20. However, more lights 36 may provide the ability to obtain additional data and a higher accuracy with an associated increase in computations and processing.

Once the nominal positions of the reflected light are selected for the particular type of facet 24, the position of the plurality of lights 36 in the light panel 30 may be calculated using the above equations. When this is done for each of the plurality of facets 24, the number of lights 36 in the light panel 30 would be 4 or 5 times the number of facets 24. In general, this total number of lights 36 in the light panel 30 may be significantly reduced because many of the lights 36 will be located very close together on the light panel 30 and provide overlapping data. This is because of the optical geometry and the differing aimpoints for each facet 24. Thus, a single light 36 may be used when the calculations recommend multiple lights 36 on the light panel 30 that are within a given radius of each other.

For concentrators 20 used in gravity affected environments, the bending effect on the concentrator 20 due to the gravity is preferably incorporated into the processing. The gravity bending moment on the concentrator 20 will change over the day as the elevation angle of the concentrator 20 is changed to followed the desired incidence such as the sun. As the gravity moment changes, the orientation of each faucet 24 may be affected such that the aligned flux pattern is moved from the optimum.

The effect from gravity bending may be minimized by either aligning the facets 24 when the concentrator 20 is positioned to the expected maximum power production orientation or by modifying each of the desired aimpoints by adding the calculated gravity bending shift. The bending shift may be incorporated into the calculations and processing performed by the operator controller 16 or other processor. Thus, for optimum performance, each of the facets 24 is preferably aligned so that the optimum flux pattern is obtained during the maximum power production part of the day.

Figure 12A:
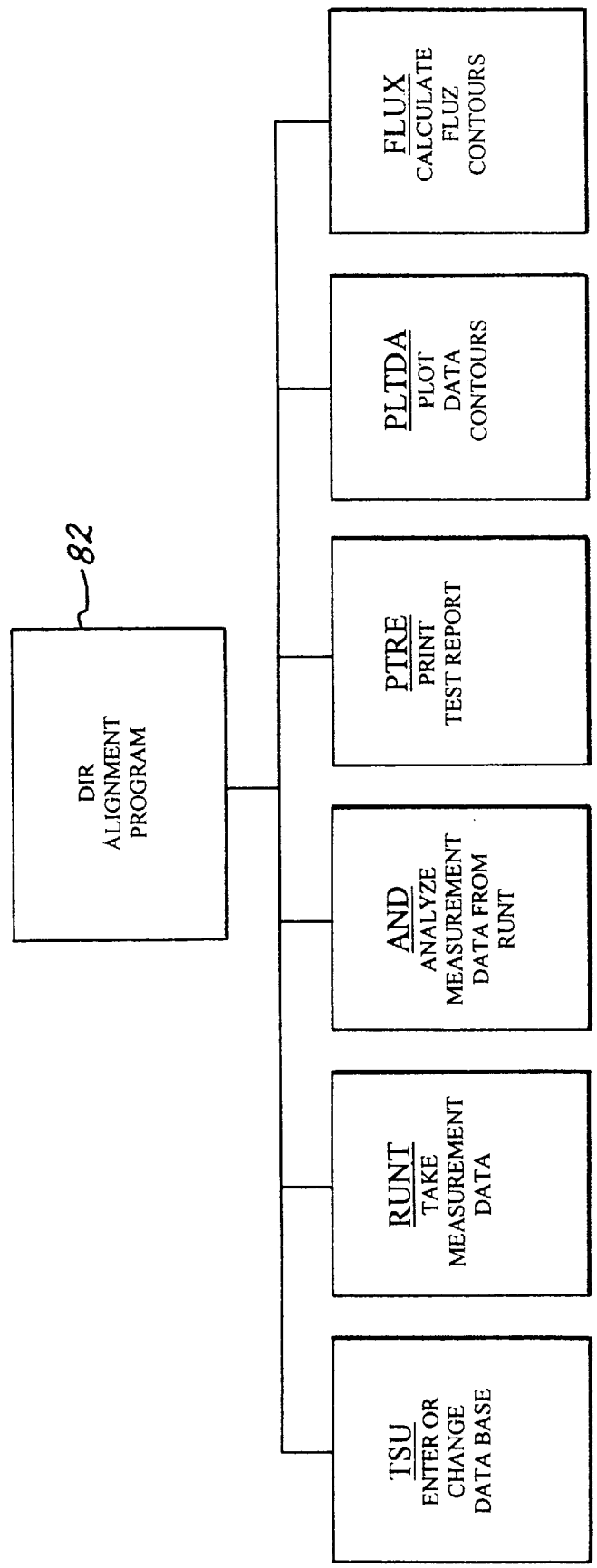
FIG. 12a is a flow diagram of a software program for calculating the angular position and alignment data of each facet according to the principles of the present invention.
Figure 12B:
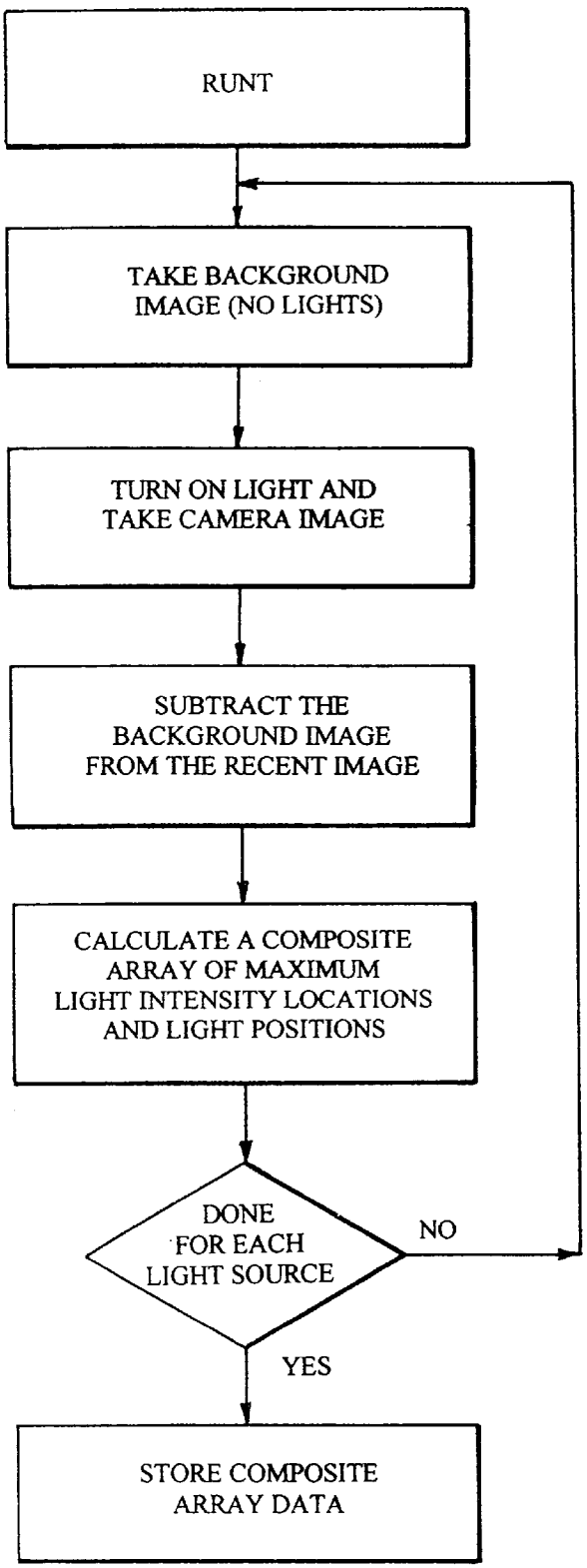
Figure 12C:
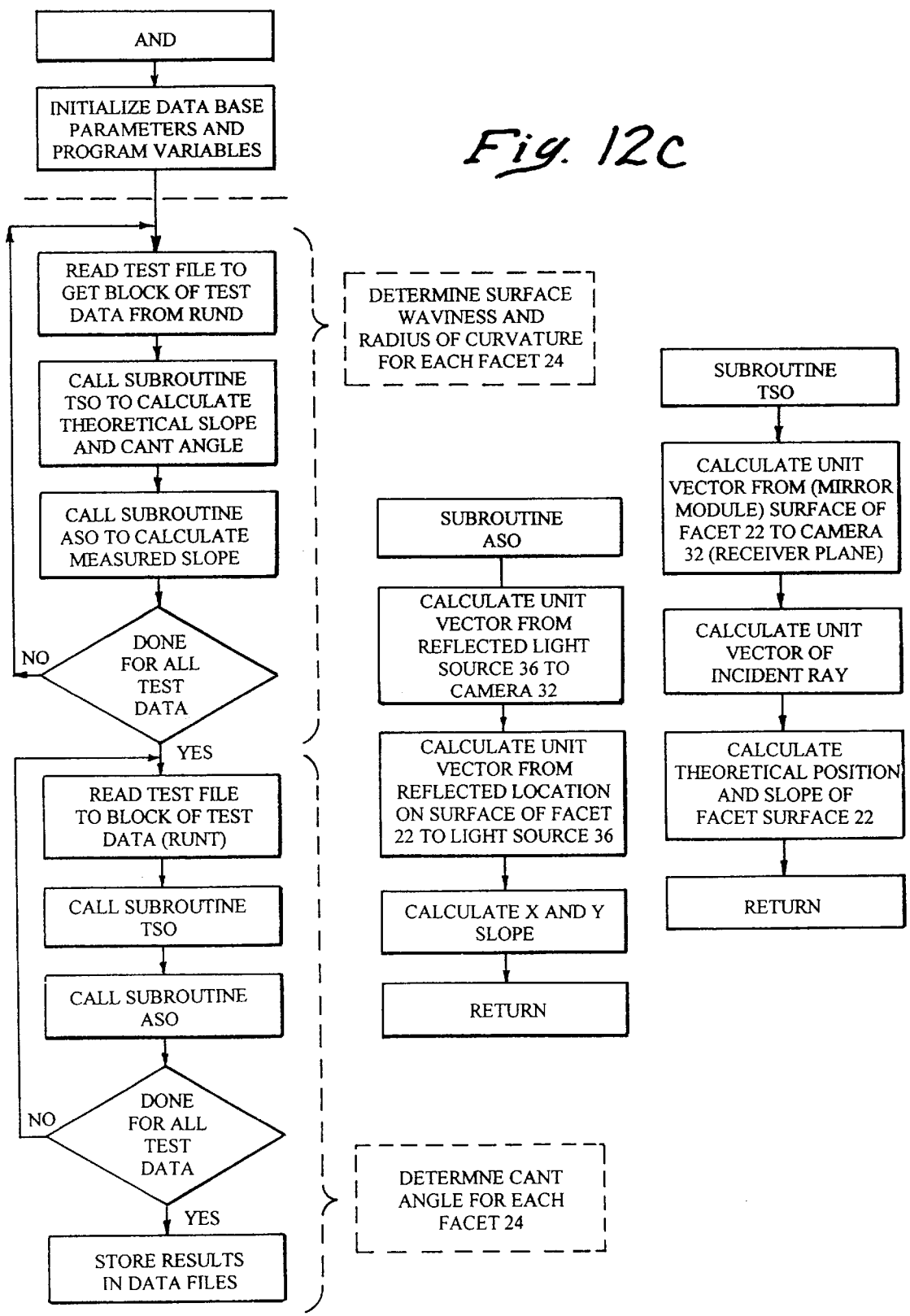

Referring now to FIGS. 12a through 12c, the DIR alignment program 82 will be described in greater detail. It should be understood that many methods and techniques may be devised for determining the described data and calculations necessary to align each of the facets 24 and the presently described program is only intended as a possible method and should not be deemed limiting. A general overview of the DIR alignment program 82 is shown in FIG. 12a. The program 82 may generally be broken into two main parts, the first part is used to obtain the described measurement data and the second part analyzes this data and determines the surface waviness, the radius of curvature and the facet cant angle.

A flow diagram of the first part of the alignment program 82, identified as RUNT is shown in FIG. 12b. This subroutine determines the background information previously described. In particular, the subroutine directs the camera 32 to first takes a background image without any of the lights 36 turned on. Another image is then taken with only one of the plurality of lights 36 illuminated. The background image is subtracted from this image and the results are compared to a composite array. Pixel locations that have a higher intensity value are stored in the composite array and the individual light 36 is identified and this identification is stored in another composite array. After all of the lights 36 have been turned on, in sequence, the data is stored in a data file, as shown in FIG. 12b.

The second part of the alignment program 82, identified as AND is shown in FIG. 12c. This subroutine may be divided into two separate subroutines identified as TSO and ASO. The TSO subroutine determines the best estimate of the surface of each facet 24 based upon the test measurements taken in the RUNT subroutine. The TSO subroutine calculates the theoretical slope required at each pixel location for the incident energy (sun ray) to be reflected at the required aimpoint on the receiver. The ASO subroutine use the best fit surface to determine the cant angles of the surface of the facet 22. The calculations are based on the measured slope as determined by the pixel location, camera location and each light location. Other subroutines may be provided to determine any adjustments necessary for moving any mounting screws on each facet 24, to calculate the vector of the source of incident rays and the camera constants, as well as to calculate the boundaries of each of the facets 24.

Figure 13:
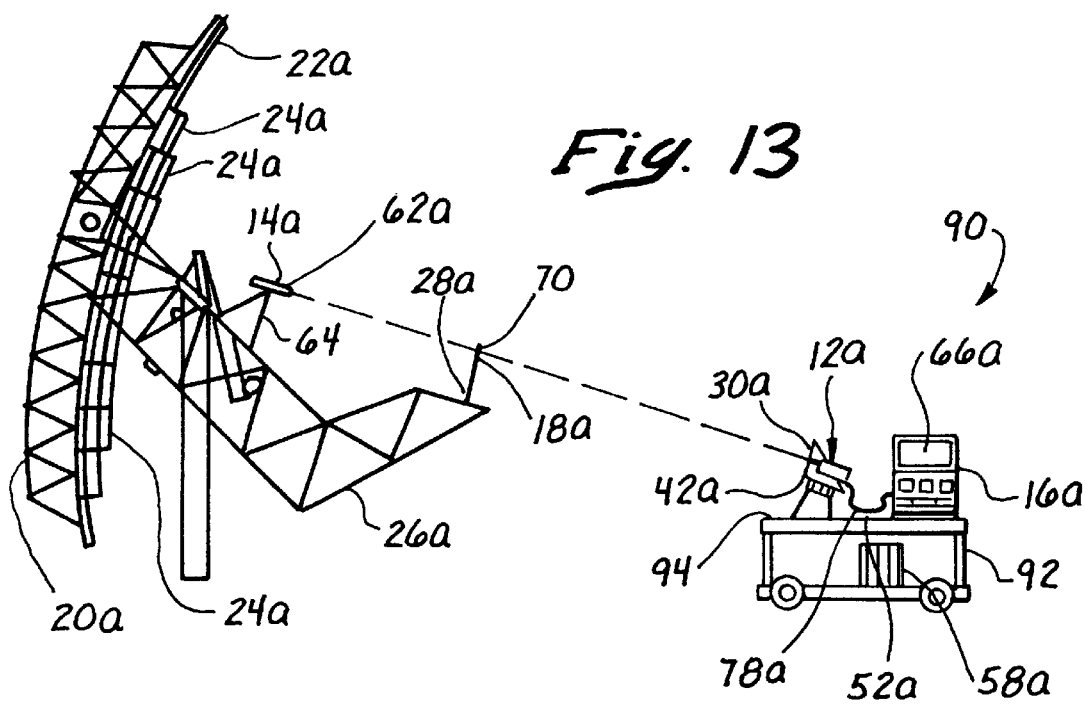
FIG. 13 is a diagram of an alternative embodiment of the present invention showing the components installed on a dish concentrator.

Referring now to FIG. 13, an alternative embodiment of an alignment apparatus for aligning facets on a dish concentrator according to the principles of the present invention is shown. In this embodiment, like features to those of the previous embodiment are designated by like reference numerals, succeeded by the letter "a". The present alignment system 90 is shown installed on a typical concentrator 20a. The alignment system 90 may include a cart assembly 92 for supporting the camera and light assembly 12a. The cart assembly 92 may also support the operator controller 16a and supply the necessary power requirements to the alignment system 90. The cart 92 may be a wheeled push cart, a drivable cart or any cart that is suitable for supporting electronic devices. The cart 92 may also have a vertically adjustable support surface 94 for elevating or lowering the camera and light assembly 12a. The cart assembly 92 may be positioned in relation to the concentrator 20a for optimum use of the camera and light assembly 12a as described above.

In another embodiment of the present invention, the alignment apparatus 90 and method may be used to align sections of dish apparatus for directing reflected electromagnetic or other wave energy. For example, the apparatus 90 may be modified to align the facets or surfaces of a electromagnetic energy or radar antenna. The apparatus 90 may be configured for the appropriate dish and facet size.

In yet another alternative embodiment, the apparatus of the present invention may be used to align large section of a spacecraft that may be aligned and assembled in space. In this embodiment, the alignment system would be mounted on one section of the craft and used to reflect an incident beam off of a reflective surface mounted on the opposing section.

In still another alternative embodiment, the apparatus of the present invention may be used to determine the alignment of large structures and tooling or mandrels for forming large structures. In this embodiment, the alignment system would be mounted on one section of the structure and used to reflect an incident beam off of a reflective surface mounted on the opposing section or structure.

In another alternative embodiment, the alignment system and method of the present invention may be modified for use during the manufacture of dish concentrators. The entire process may be incorporated into a production line. The method may be automated such that it may be very cost effective to use this system in the main factory during concentrator assembly for initial facet alignment.

While this invention has been described with respect to various specific examples and embodiments, it is to be understood that the invention is not limited thereto and that it can be variously practiced within the scope of the following claims.

What is claimed is:

1. An apparatus for aligning a facet on a dish concentrator having a plurality of adjustable facets, each of the facets for reflecting a portion of an incident energy towards at least one aimpoint on a receiver, said apparatus comprising:

a light assembly having a plurality of spaced apart radiation emitting sources for emitting an electromagnetic radiation against a plurality of locations on the facet;

a radiation detector mounted adjacent the light assembly for receiving and detecting at least a portion of the emitted electromagnetic radiation which is reflected off of the facet;

an alignment assembly supported relative to the concentrator and adapted for aligning the radiation detector relative to a fixed position on the dish concentrator;

a processor electrically coupled to the radiation detector and the light assembly for controlling the radiation detector and the light assembly and for determining an actual angular position and an optimum alignment position for the facet based on data received from the radiation detector relative to the emitted electromagnetic radiation; and a support member for supporting the light assembly and the radiation detector in a fixed position relative to the dish concentrator and spaced apart from the plurality of facets.

2. The apparatus as recited in claim 1 wherein the processor comprises a keyboard and a monitor.

3. The apparatus as recited in claim 1 wherein said emitted electromagnetic radiation comprises radar waves.

4. The apparatus as recited in claim 1 wherein said emitted electromagnetic radiation comprises light and said radiation detector comprises a camera.

5. The apparatus as recited in claim 4 wherein the light assembly comprises a light panel having a plurality of spaced apart lights, each of which is directed towards the plurality of facets.

6. An apparatus for aligning a facet on a parabolic dish concentrator having a plurality of facets, each of said plurality of facets having a reflective surface for reflecting an incident energy towards a plurality of aimpoints on a receiver coupled to said concentrator, said apparatus comprising:

a light assembly having a plurality of essentially identical light sources, each of said light sources being spaced apart and individually illuminable for illuminating a selected location on the reflective surface of the facet surface with light, said light assembly being spaced apart from the plurality of facets;

a camera having a lens for detecting light images and creating light image data, said camera being positioned at a fixed distance from the plurality of facets and oriented to receive and detect at least a portion of the light reflected from each of the locations of the reflective surface of the facet;

an alignment device supported relative to the concentrator and adapted for aligning the lens with a fixed position on said concentrator and for ensuring the lens does not deviate from said fixed position;

a support member for rigidly supporting the camera and the light assembly relative to the plurality of facets; and a process or in electrical connection with the camera and the light assembly for controlling the camera and each of the plurality of lights and for determining an actual angular position and an optimum alignment position for the facet based on data received from the camera relative to the illumination of the light assembly.

7. The apparatus as recited in claim 6 wherein said alignment device comprises:
a fixture having a central bore and being supported such that the central bore defines an axis parallel to a centerline of the concentrator; and
a laser fixedly supported in relation to the concentrator for emitting a laser beam through said central bore and into said lens.

8. The apparatus as recited in claim 6 and further comprising a monitor for displaying alignment information, said monitor in electrical connection with said camera and said processor.

9. The apparatus as recited in claim 6 wherein at least some of said plurality of lights comprise low voltage LED lights.

10. The apparatus as recited in claim 6 and further comprising a plurality of secondary lights mounted adjacent to the light assembly.

11. The apparatus as recited in claim 10 wherein at least one of said secondary lights comprises a flood light.

12. The apparatus as recited in claim 6 wherein said support member comprises an elongate collapsible member having a pair of opposing ends, said support member being attached to the concentrator at one end and extendable to support the camera and light assembly at the other end.

13. The apparatus as recited in claim 6 wherein said support member comprises a moveable cart having a support surface for supporting the light assembly and the camera.

14. The apparatus as recited in claim 6 and further comprising an adjustable positioning cable, said cable attached to the concentrator at a first end and to the support member at an opposing end.

15. The apparatus as recited in claim 6 wherein said camera comprises a video camera having an adjustable iris.

16. A method for aligning a facet on a dish concentrator having a plurality of facets and adapted for reflecting and concentrating an incident electromagnetic radiation, each facet having an optimum alignment orientation such that a portion of the incident electromagnetic radiation is accurately reflected to an aimpoint on a receiver coupled to the concentrator, said method comprising the steps of:
supporting a camera and light assembly having a plurality of substantially identical light sources and a camera with an adjustable iris, in a position spaced apart from the plurality of facets;
supporting a controller adjacent the camera and light assembly for controlling the adjustable iris and the illumination of each of the plurality of light sources;
electrically coupling the controller box to a processor having a display;
aligning the camera with a fixed position relative to the concentrator;
determining an initialization data;
illuminating a plurality of locations on the facet using at least some of the plurality of individual light sources, each of the respective light sources emitting a light of essentially equivalent intensity, one at a time in sequence;
receiving light reflected from the plurality of different locations on the facet in response to the illuminating light, the light being received by the camera;
identifying the different locations on the facet illuminated by the respective light source using the light assembly in conjunction with the camera and processor;
calculating an actual angular position for the facet relative to the aligned camera position;
determining an optimum alignment position for the facet which accurately reflects the incident electromagnetic radiation from the facet to the aimpoint on the receiver;
determining an adjustment necessary to move the facet into the optimum alignment position by comparing the actual angular position of the facet with the optimum facet position; and
aligning the facet into the optimum alignment position.

17. The method as recited in claim 16 wherein the step of calculating an actual angular position of the facet comprises the steps of:
determining whether the light produced by any one of the light sources and reflected by a location on the facet has an overlap with the light produced by another light source and reflected from the same location on the facet;
identifying the light source which results in a greatest intensity of reflected light from any overlap of reflected light at the location on the facet;
calculating a plurality of angular slopes, one for each of the illuminated locations on the facet, each angular slope based on the relative position between the respective illuminating light source that resulted in the greatest intensity of light at the facet location and the relative position between the facet and the facet location at which the reflected light is received;
determining an approximated line based on the calculated angular slopes determined for each of the illuminated positions;
calculating a cant angle axis and an intercept of the approximated line and the cant angle axis to obtain the facet normal in terms of cant angles and the actual angular position of the facet.

18. The method as recited in claim 16 and further comprising the step of repeating the steps of illuminating, receiving, identifying, calculating, determining the optimum alignment position and determining the adjustment necessary to align each of the remaining plurality of facets.

19. The method as recited in claim 16 and further comprising the step of re-orienting said concentrator such that the plurality of facets are generally aligned with an expected maximum radiation incidence.

20. The method as recited in claim 16 and further comprising the step of removing said receiver prior to illuminating the facet such that each of the plurality of facets are fully exposed to the camera and light assembly.

21. The method as recited in claim 16 and further comprising the step of measuring a background level of light intensity reflected from the facet into the lens and subtracting said background level of light intensity from a level of reflected light intensity received from each of the respective plurality of light sources to determine an actual level of light intensity reflected from each light source.

22. The method as recited in claim 16 wherein the step of determining an initialization data comprises the steps of:
providing at least one flood light supported adjacent the camera and light assembly;
illuminating the plurality of facets with a light from said flood light;
synchronizing the camera with the light from the flood light to get a clear image from the reflected flood light to show the plurality of facets; and
determining the initialization data from the clear image of the plurality of facets to define a location for each of the plurality of facets and a location for any non-mirrored surfaces.

23. The method as recited in claim 22 wherein the step of calculating comprises the step of excluding any initialization data from the non-mirrored surfaces.

24. The method as recited in claim 22 wherein the step of aligning the camera comprises supporting a laser relative to the concentrator such that an emitted laser beam is aligned with the centerline of the concentrator and directed into the camera prior to receiving any reflected light into the camera.

* * * * *